US011993049B2

(12) United States Patent
Ito

(10) Patent No.: US 11,993,049 B2
(45) Date of Patent: May 28, 2024

(54) PRESS MACHINE

(71) Applicant: AIDA ENGINEERING, LTD., Kanagawa (JP)

(72) Inventor: Takao Ito, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 249 days.

(21) Appl. No.: 17/484,989

(22) Filed: Sep. 24, 2021

(65) Prior Publication Data

US 2022/0097333 A1 Mar. 31, 2022

(30) Foreign Application Priority Data

Sep. 28, 2020 (JP) ................................ 2020-162021

(51) Int. Cl.

*B30B 15/14* (2006.01)
*B30B 15/00* (2006.01)
*B30B 15/06* (2006.01)

(52) U.S. Cl.

CPC ...... *B30B 15/0035* (2013.01); *B30B 15/0023* (2013.01); *B30B 15/0041* (2013.01); *B30B 15/068* (2013.01); *B30B 15/14* (2013.01)

(58) Field of Classification Search

CPC ........... B30B 1/26; B30B 1/261; B30B 1/266; B30B 15/0023; B30B 15/0035; B30B 15/065; B30B 15/068; B30B 15/16

See application file for complete search history.

(56) References Cited

U.S. PATENT DOCUMENTS

| | | | | |
|---|---|---|---|---|
| 2,404,351 A | | 7/1946 | Anderson | |
| 2,532,320 A | | 12/1950 | Maussnest | |
| 3,400,625 A | | 9/1968 | Wrona | |
| 4,761,988 A | * | 8/1988 | Kato | B30B 1/26 100/282 |

(Continued)

FOREIGN PATENT DOCUMENTS

| | | |
|---|---|---|
| EP | 3 308 949 A1 | 4/2018 |
| JP | 51-103372 A | 9/1976 |

(Continued)

OTHER PUBLICATIONS

Extended European Search Report issued in corresponding European Patent Application No. 21192803.1-1017 dated Feb. 18, 2022.

(Continued)

*Primary Examiner* — Matthew Katcoff
(74) *Attorney, Agent, or Firm* — Rimon P.C.

(57) ABSTRACT

There is provided a press machine capable of simplifying a slide drive mechanism. The press machine comprises: a slide supported so as to be reciprocally movable; a crankshaft arranged along a longitudinal direction of the slide and having a plurality of eccentric parts; a drive unit configured to rotate the crankshaft; a plurality of yokes and each provided to each of the eccentric parts of the crankshaft and configured to reciprocate, due to rotation of the crankshaft, along a moving direction of the slide; and a plurality of points each connects each of the yokes to the slide, wherein at least one of the plurality of yokes is connected to the slide via some of the plurality of points arranged along a direction perpendicular to an axial direction of the crankshaft.

6 Claims, 14 Drawing Sheets

(56) References Cited

U.S. PATENT DOCUMENTS

| | | | | |
|---|---|---|---|---|
| 5,226,337 | A | 7/1993 | Imanishi et al. | |
| 5,782,132 | A * | 7/1998 | Ishibashi | B30B 1/266 100/282 |
| 10,850,466 | B2 * | 12/2020 | Ito | B30B 15/041 |
| 2001/0002566 | A1 * | 6/2001 | Eigenmann | B30B 15/041 83/646 |
| 2003/0010077 | A1 | 1/2003 | Mukai et al. | |
| 2012/0180675 | A1 | 7/2012 | Graf | |
| 2012/0272843 | A1 | 11/2012 | Graff | |
| 2018/0104734 | A1 * | 4/2018 | Gaebges | B21D 24/00 |
| 2018/0326683 | A1 | 11/2018 | Krieger | |
| 2018/0354219 | A1 * | 12/2018 | Kohno | B30B 15/028 |
| 2020/0031081 | A1 | 1/2020 | Ito et al. | |

FOREIGN PATENT DOCUMENTS

| | | | |
|---|---|---|---|
| JP | 57-014499 | A | 1/1982 |
| JP | 2001-121297 | A | 5/2001 |
| JP | 2004-074197 | A | 3/2004 |
| JP | 2005-224863 | A | 8/2005 |
| JP | 2006-061974 | A | 3/2006 |
| JP | 2008110354 | A | 5/2008 |
| JP | 4370623 | B2 | 11/2009 |
| JP | 2013-500164 | A | 1/2013 |
| JP | 2013-509999 | A | 3/2013 |
| JP | 2014-034038 | A | 2/2014 |
| WO | 2008/126590 | A1 | 10/2008 |
| WO | 2016/204103 | A1 | 12/2016 |
| WO | 2017/084952 | A1 | 5/2017 |

OTHER PUBLICATIONS

European Official Communication dated Oct. 4, 2023 for the corresponding European Patent Application No. 21192803.1.

Japanese Office Action dated Jun. 23, 2023 in the counterpart Japanese Patent Application No. 2020-162021, with English translation.

* cited by examiner

PRESS MACHINE

CROSS-REFERENCE TO RELATED APPLICATIONS

The present application claims priority under 35 U.S.C. § 119 to Japanese Patent Application No. 2020-162021 filed on Sep. 28, 2020. The above application is hereby expressly incorporated by reference, in its entirety, into the present application.

BACKGROUND OF THE INVENTION

Field of the Invention

The present invention relates to a press machine, and more particularly to a press machine having a configuration in which a slide is pressed at a plurality of points.

Description of the Related Art

Mainly, a large press machine has a configuration in which a plurality of points are arranged on a slide and the slide is pressed at the plurality of points (suspensions).

In a press machine configured to press the slide at a plurality of points arranged in the longitudinal direction of the slide and in a direction perpendicular to the longitudinal direction, a slide drive mechanism is conventionally configured using a plurality of crankshafts (for example, Japanese Patent Application Laid-Open No. 2006-61974, Japanese Patent Application Laid-Open No. 2001-121297, etc.).

CITATION LIST

Patent Literature 1: Japanese Patent Application Laid-Open No. 2006-61974

Patent Literature 2: Japanese Patent Application Laid-Open No. 2001-121297

SUMMARY OF THE INVENTION

However, in a case where a plurality of crankshafts are used for the slide drive mechanism, there is a disadvantage in that the configuration of the slide drive mechanism becomes complicated and large.

The present invention has been made in view of such circumstances, and aims to provide a press machine capable of simplifying a slide drive mechanism.

(1) A press machine, comprising: a slide supported so as to be reciprocally movable; a crankshaft arranged along a longitudinal direction of the slide and having a plurality of eccentric parts; a drive unit configured to rotate the crankshaft; a plurality of yokes each provided to each of the eccentric parts of the crankshaft and configured to reciprocate along a moving direction of the slide, due to rotation of the crankshaft; and a plurality of points each connects each of the yokes to the slide, wherein at least one of the plurality of yokes is connected to the slide via some of the plurality of points arranged along a direction perpendicular to an axial direction of the crankshaft.

According to the aspect a mechanism called Scotch yoke mechanism is employed to achieve a configuration in which a plurality of points are arranged on the slide in the longitudinal direction of the slide and in a direction perpendicular to the longitudinal direction and the slide is pressed with one crankshaft. This can simplify a slide drive mechanism. In addition, employing the Scotch yoke mechanism enables the slide drive mechanism to be compact. That is, unlike the drive mechanism using a connecting rod, Scotch yoke mechanism has no influence of the inclination due to the connecting rod ratio. Therefore, it is possible to shorten the length of a connecting part between the yoke and each point. This enables the dimensions (size) of the press machine to be compact in the vertical direction (moving direction of the slide). In addition, this can reduce the moment of inertia of the drive system.

(2) The press machine according to aspect (1), wherein: at least two of the plurality of eccentric parts are provided to both end parts of the crankshaft in the axial direction; and at least one of the plurality of yokes which is provided to the eccentric parts at the both end parts of the crankshaft in the axial direction is connected to both end parts of the slide in the longitudinal direction via some of the plurality of the points, arranged along the direction perpendicular to the axial direction of the crankshaft.

According to the aspect, one of the plurality of yokes is provided to least at both end parts of the crankshaft. Then, the yoke provided to both end parts of the crankshaft is connected to both end parts of the slide in the longitudinal direction, via some of the plurality of points. This enables the slide to be pressed more stably.

(3) The press machine according to aspect (2), wherein one of the plurality of eccentric parts is provided between the eccentric parts at the both end parts of the crankshaft in the axial direction; and one of the plurality of yokes which is provided to one of the plurality of eccentric parts provided between the two eccentric parts at the both end parts of the crankshaft in the axial direction is connected to the slide via one of the plurality of points.

According to the aspect, in addition to both ends of the crankshaft, the yoke is provided at a position between the both ends of the crankshaft (for example, in the center). The yoke is then connected to the slide via one of the plurality of points. This can reduce the deflection of the slide. In addition, this enables to reduce rigidity of the slide so as to make the vertical dimension of the slide compact. Furthermore, this can reduce moment of inertia of the drive system.

(4) The press machine according to any one of aspects (1) to (3), wherein the drive unit includes: a main gear provided on the crankshaft; a pinion gear configured to mesh with the main gear; and a motor configured to rotate the pinion gear.

According to the aspect, the drive unit includes a main gear provided on the crankshaft, a pinion gear that meshes with the main gear, and a motor that rotates the pinion gear. In a case where the motor is driven, the rotation of the motor is transmitted to the main gear via the pinion gear, so that the main gear rotates. Then, rotation of the main gear causes the crankshaft to rotate.

(5) The press machine according to aspect (4), wherein the pinion gear is provided in plural number, the motor is provided in plural number, the plurality of pinion gears mesh with the main gear, and the main gear is driven by the plurality of motors.

According to the aspect, a plurality of pinion gears are meshed with one main gear, and one main gear is driven by a plurality of motors. Meshing a plurality of pinion gears with one main gear can reduce the transmission torque per meshing part of the gears. This can reduce the tooth width of the main gear. In addition, this can reduce the moment of inertia of the main gear.

(6) The press machine according to aspect (4) or (5), wherein the main gear is provided in plural number, and the plurality of main gears are provided on a plurality of positions of the crankshaft.

According to the aspect, main gears are provided on a plurality of positions of the crankshaft. This can reduce the transmission torque per main gear. This can reduce the tooth width of the main gear. In addition, this can reduce the moment of inertia of the main gear.

(7) The press machine according to any one of aspects (4) to (6), wherein the motor is arranged along the axial direction of the crankshaft.

According to the aspect, the mounting direction of the motor and the longitudinal direction of the slide can be the same direction. This enables a motor having a large axial dimension to be mounted compactly.

(8) The press machine according to any one of aspects (1) to (7), further comprising a control unit configured to control drive of the drive unit, wherein the control unit controls drive of the drive unit so that movement of the slide pauses at a top dead center or near the top dead center for a certain period of time every cycle.

According to the aspect, the drive unit is driven so that movement of the slide pauses at the top dead center or near the top dead center for a certain period of time every cycle. This enables to secure sufficient loading and unloading time of the work, and can shorten the stroke of the slide. In addition, this enables to shorten the length of the connecting part between the yoke and the point, and reduce the moment of inertia of the drive system.

(9) The press machine according to aspect (8), wherein the control unit drives the crankshaft to stop rotation or decelerate rotation at the top dead center or near the top dead center of the slide.

According to the aspect, the rotation of the crankshaft (motor drive control) is controlled so as to achieve the operation of pausing the movement of the slide for a certain period of time at the top dead center or near the top dead center every cycle.

The present invention can simplify the slide drive mechanism in the press machine having a configuration to press the slide at a plurality of points.

DETAILED DESCRIPTION OF THE PREFERRED EMBODIMENTS

Preferred embodiments of the present invention are described below in detail with reference to the accompanying drawings.

First Embodiment

[Machine Configuration]

Figure 1:
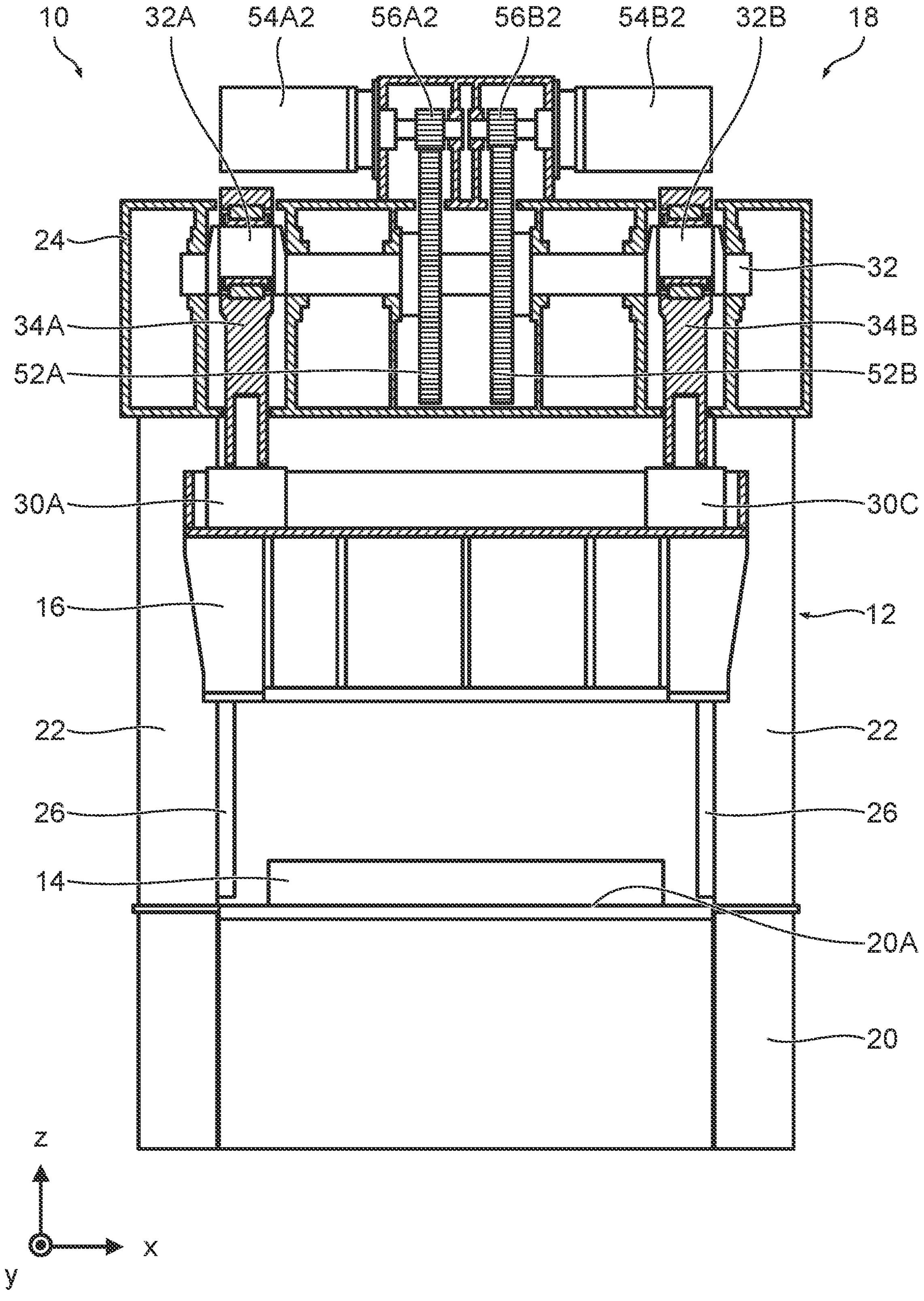
FIG. 1 is a front partial cross-sectional view showing an embodiment of a press machine to which the present invention is applied.
Figure 2:
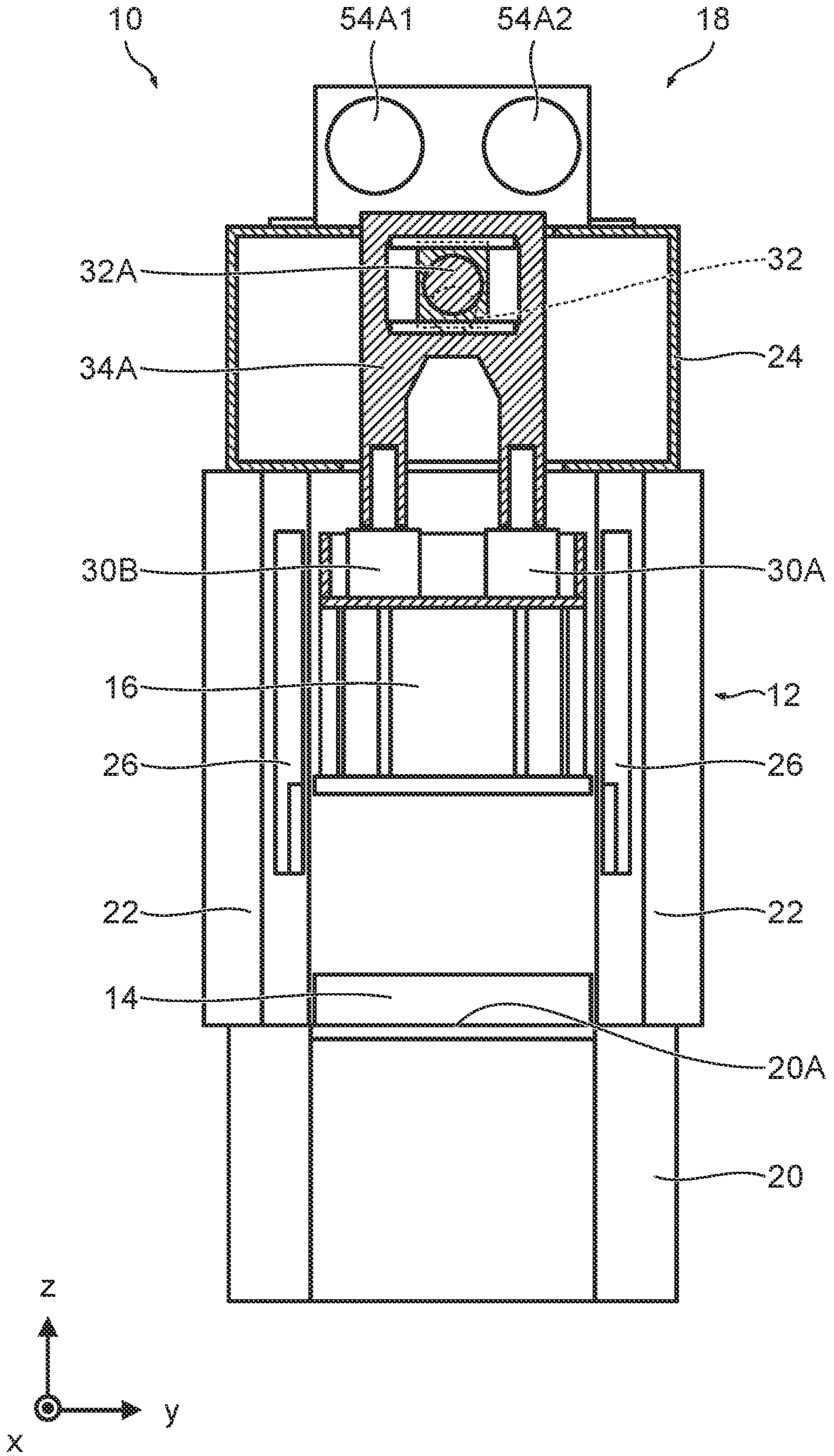
FIG. 2 is a side partial cross-sectional view showing the embodiment of the press machine to which the present invention is applied.

FIGS. 1 and 2 are respectively a front partial cross-sectional view and a side partial cross-sectional view showing an embodiment of a press machine to which the present invention is applied. Here, in FIGS. 1 and 2, the direction designated by a reference character x is the lateral (right-left) direction of the machine, the direction designated by a reference character y is the front-rear direction of the machine, and the direction designated by a reference character z is the up-down (vertical) direction of the machine.

The press machine 10 according to the embodiment is a press machine having a configuration to press a slide at four points. As shown in FIGS. 1 and 2, the press machine 10 includes a frame 12, a bolster 14, a slide 16, and a slide drive mechanism 18.

The frame 12 is of a type called a straight-side frame. The frame 12 includes a bed 20, columns 22, and a crown 24. The bed 20, the columns 22 and the crown 24 are integrally assembled via a tie rod (not shown).

The bed 20 is a base part that receives press pressure. Then upper surface 20A of the bed 20 configures a horizontal plane. The bolster 14 is mounted on the upper surface 20A of the bed 20.

The columns 22 are provided to the four corners of the bed 20. Each column 22 is installed perpendicular to the upper surface 20A of the bed 20.

The crown 24 is provided to the upper end parts of the columns 22. As is to be described below, the slide drive mechanism 18 is provided on the crown 24.

The bolster 14 is a surface plate to which a die is attached. As described above, the bolster 14 is mounted on the upper surface 20A of the bed 20.

The slide 16 is a part that reciprocates in a state where the die is attached. As shown in FIG. 1, the slide 16 according to the embodiment has a laterally long shape in which the lateral dimension is greater than the front-rear dimension. Therefore, the lateral direction (x direction) is a longitudinal direction of the slide 16. The slide 16 is supported so as to be slidable (reciprocally movable) in the vertical direction via slide guides 26 provided on the columns 22.

Figure 3:
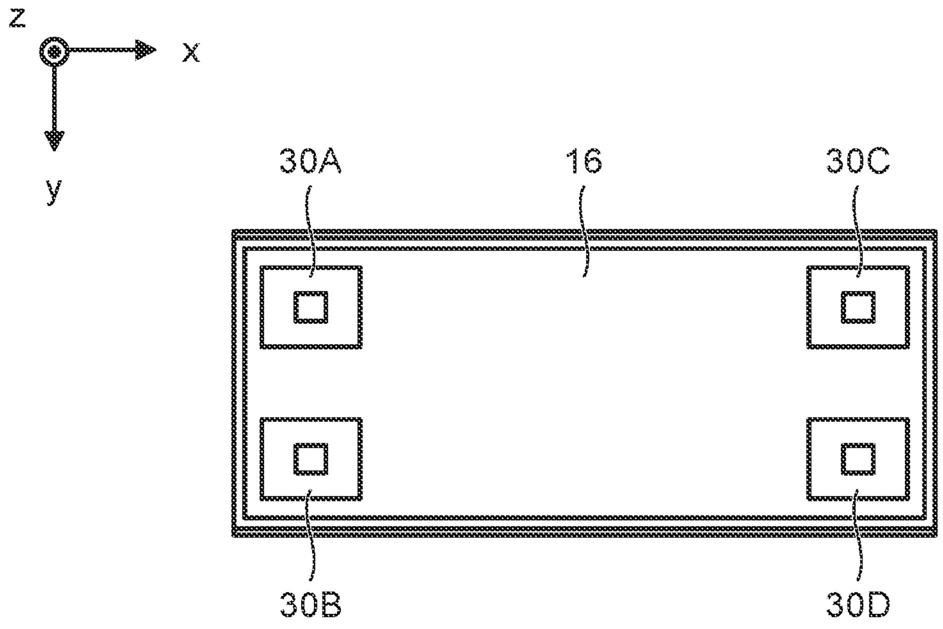
FIG. 3 is a plan view of a slide.

FIG. 3 is a plan view of the slide.

As shown in FIG. 3, the upper surface part of the slide 16 has points 30A to 30D at four positions. The points 30A to 30D are connecting parts between the slide 16 and the slide drive mechanism 18. Therefore, the installation positions of the points 30A to 30D are pressurizing points of the slide 16. As shown in FIG. 3, the points 30A to 30D are arranged at the four corners of the upper surface, in the slide 16 of the embodiment. Hereinafter, the point 30A is designated as a first point 30A, the point 30B as a second point 30B, the point 30C as a third point 30C, and the point 30D as a fourth point 30D so that the respective points 30A to 30D are distinguished as necessary.

As shown in FIG. 3, the first point 30A and the second point 30B are arranged along the front-rear direction of the slide 16. Similarly, the third point 30C and the fourth point 30D are arranged along the front-rear direction of the slide 16. On the other hand, the first point 30A and the third point 30C are arranged along the lateral direction of the slide 16. Similarly, the second point 30B and the fourth point 30D are arranged along the lateral direction of the slide 16. That is, the press machine 10 according to the embodiment has the points 30A to 30D arranged at a plurality of positions in the longitudinal direction of the slide 16 and in a direction perpendicular to the longitudinal direction.

Each of the points 30A to 30D is provided with a slide adjustment mechanism, an overload safety device, and the like, as necessary. Since these mechanisms have known configurations, the detailed description thereof is to be omitted.

The slide drive mechanism 18 converts the rotational motion of a motor into a reciprocating motion to operate the slide. As described above, the slide drive mechanism 18 is provided on the crown 24 of the frame 12.

Figure 4:
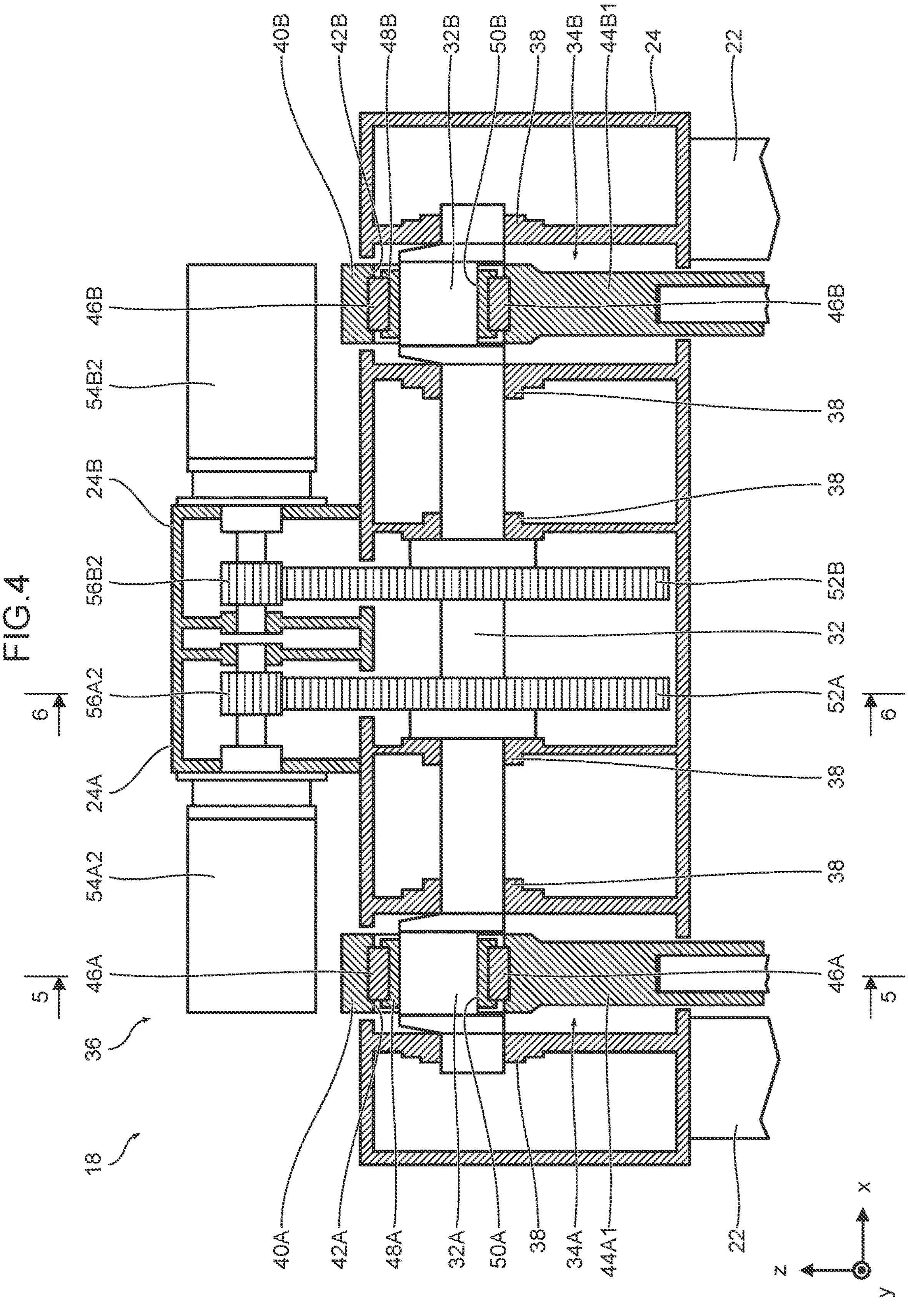
FIG. 4 is a front cross-sectional view showing a schematic configuration of a slide drive mechanism.
Figure 5:
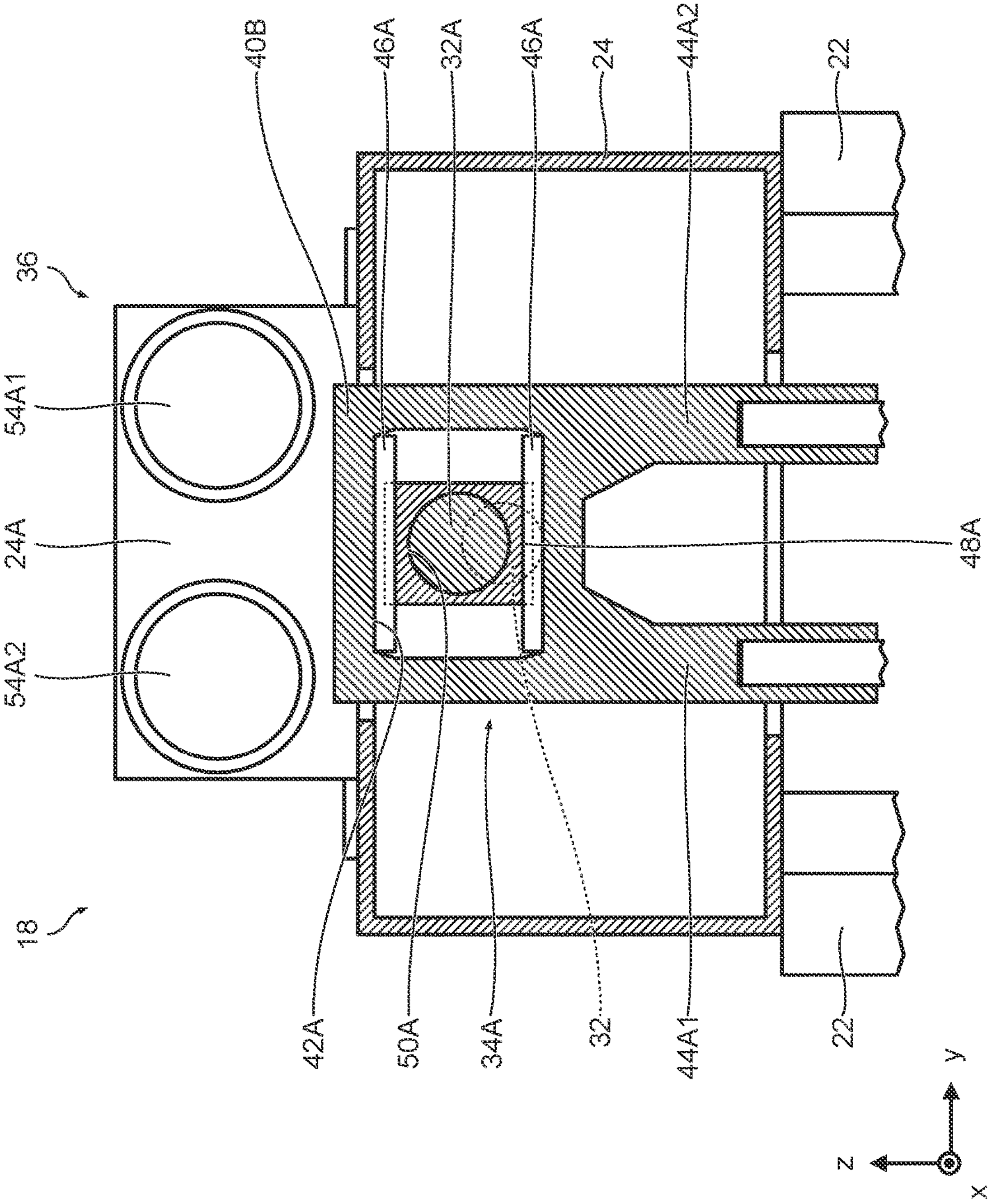
FIG. 5 is a cross-sectional view taken along the line 5-5 of FIG. 4.
Figure 6:
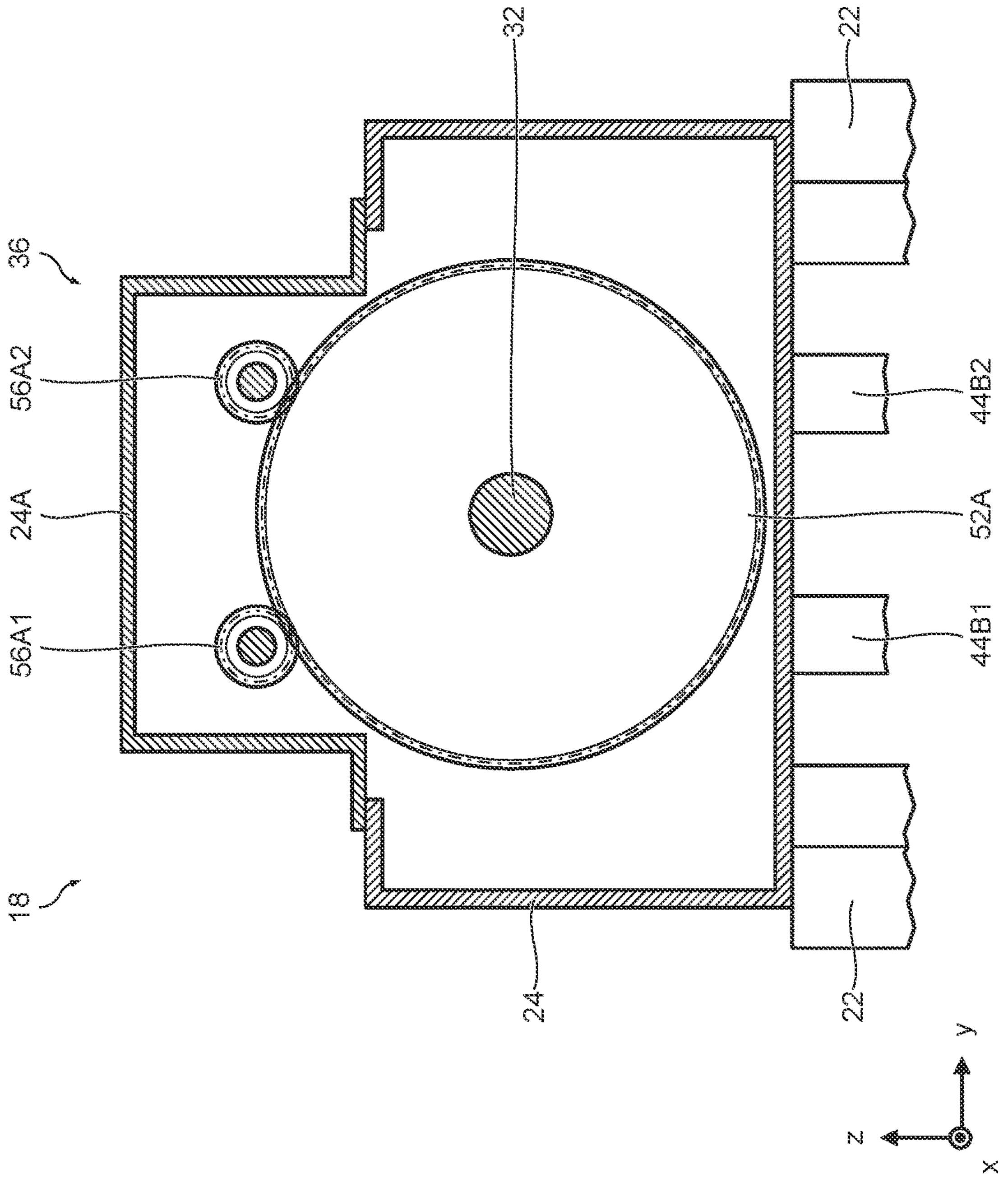
FIG. 6 is a cross-sectional view taken along the line 6-6 of FIG. 4.
Figure 7:
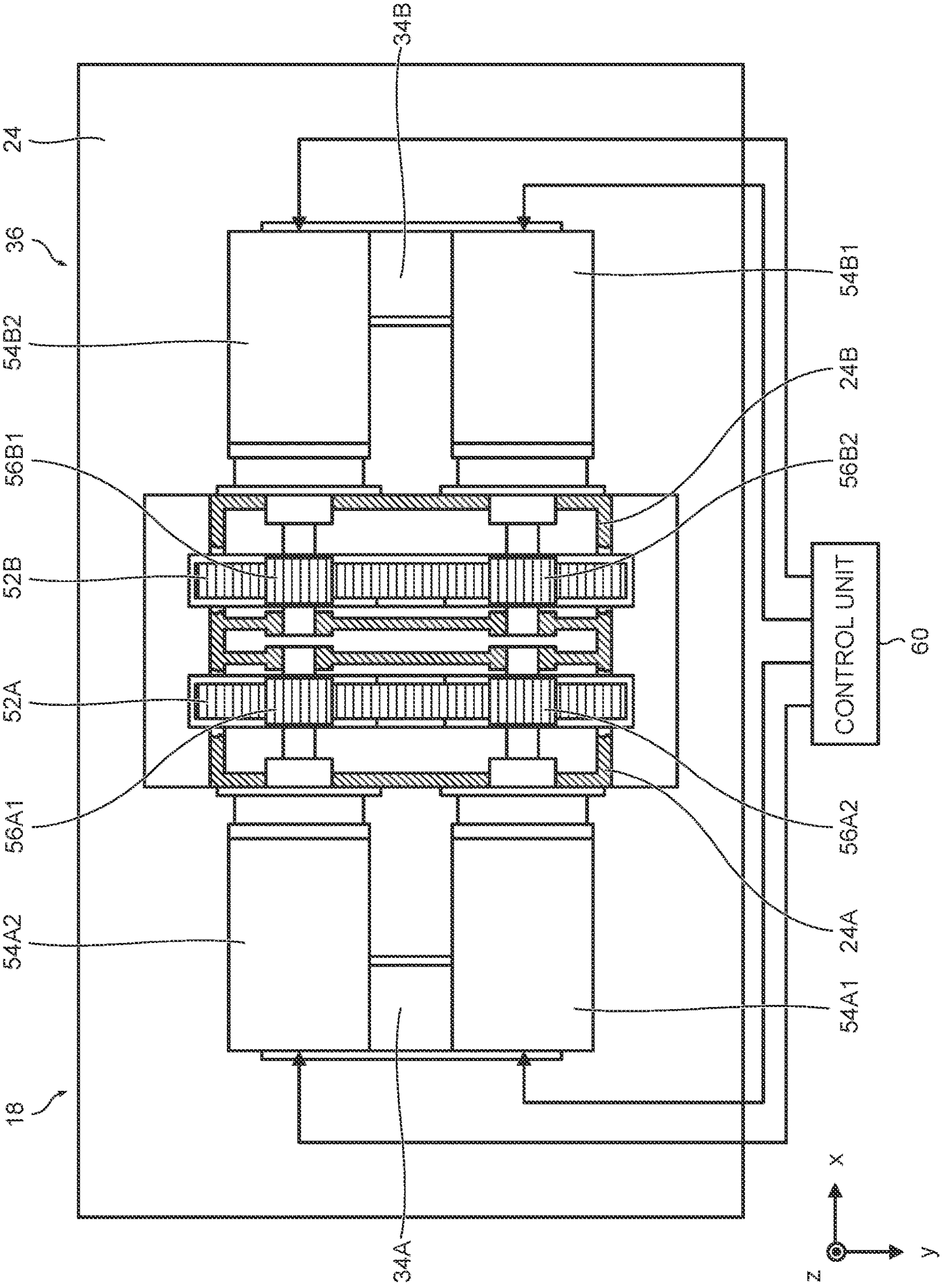
FIG. 7 is a partial cross-sectional plan view showing a schematic configuration of the slide drive mechanism.

FIG. 4 is a front cross-sectional view showing a schematic configuration of the slide drive mechanism. FIG. 5 is a cross-sectional view taken along the line 5-5 of FIG. 4. FIG. 6 is a cross-sectional view taken along the line 6-6 of FIG. 4. FIG. 7 is a partial cross-sectional plan view showing a schematic configuration of the slide drive mechanism.

The slide drive mechanism 18 includes a crankshaft 32, two yokes 34A and 34B that convert the rotational motion of the crankshaft 32 into reciprocating motion, and a drive unit 36 that rotates the crankshaft 32.

The crankshaft 32 has crankpins 32A and 32B at two positions in an axial direction of the crankshaft 32. More specifically, the crankshaft 32 has the crankpins 32A and 32B at both end parts in the axial direction. The crankpins 32A and 32B are examples of eccentric parts. In the following, one crankpin 32A is designated as a first crankpin 32A and the other crankpin 32B as a second crankpin 32B so that the two crankpins are distinguished as necessary. The crankshaft 32 is rotatably supported by a plurality of shaft support parts 38 provided in the crown 24 via bearings (not shown). The crankshaft 32, which is supported by the shaft support parts 38, is arranged along the longitudinal direction of the slide 16 (lateral direction of the machine). Furthermore, the crankshaft 32 is arranged at the central position in the front-rear direction of the slide 16.

The two yokes 34A and 34B are respectively provided at the positions of the two crankpins 32A and 32B provided on the crankshaft 32. That is, one yoke 34A is provided at the position of the first crankpin 32A, and the other yoke 34B is provided at the position of the second crankpin 32B.

In the press machine 10 according to the embodiment, the configurations of the two yokes 34A and 34B are the same. Hereinafter, one yoke 34A is designated as a first yoke 34A and the other yoke 34B as a second yoke 34B so that the two are distinguished as necessary.

The yoke 34A includes: a yoke body 40A; two connecting parts 44A1 and 44A2 extending from the yoke body 40A; guide rails 46A provided in the opening 42A of the yoke body 40A; and a bearing part 48A that slides inside the opening 42A of the yoke body 40A along the guide rails 46A. The yoke 34B includes: a yoke body 40B; two connecting parts 44B1 and 44B2 extending from the yoke body 40B; guide rails 46B provided in the opening 42B of the yoke body 40B; and a bearing part 48B that slides inside the opening 42B of the yoke body 40B along the guide rails 46B.

The yoke bodies 40A and 40B each have a rectangular flat plate shape, and respectively have the rectangular openings 42A and 42B in the central part. The opening 42A is provided with the guide rails 46A along the upper side part (upper hem part) and the lower side part (lower hem part) of the opening 42A. The opening 42B is provided with the guide rails 46B along the upper side part (upper hem part) and the lower side part (lower hem part) of the opening 42B. The guide rails 46A and 46B are arranged horizontally along the front-rear direction (y direction in FIG. 5) of the slide 16.

In the first yoke 34A, the two connecting parts 44A1 and 44A2 are parts to be connected to the two front and rear points 30A and 30B provided on the slide 16. Therefore, the two connecting parts 44A1 and 44A2 of the first yoke 34A are arranged at the same interval as the two front and rear points 30A and 30B (the first point 30A and the second point 30B).

In the second yoke 34B, the two connecting parts 44B1 and 44B2 are parts to be connected to the two front and rear points 30C and 30D provided on the slide 16. Therefore, the two connecting parts 44B1 and 44B2 of the second yoke 34B are arranged at the same interval as the two front and rear points 30C and 30D (the third point 30C and the fourth point 30D).

Here, the interval between the third point 30C and the fourth point 30D is the same as the interval between the first point 30A and the second point 30B.

The bearing parts 48A and 48B are parts to be connected to the crankshaft 32. The bearing parts 48A and 48B each have a rectangular flat plate shape. The bearing parts 48A and 48B respectively have openings 50A and 50B as bearings, in the central parts (in the centers) of the bearing parts 48A and 48B. The bearing parts 48A and 48B are arranged inside the openings 42A and 42B of the yoke bodies 40A and 40B, and are supported so as to be slidable in the openings 42A and 42B along the guide rails 46A and 46B. As described above, the guide rails 46A and 46B are arranged horizontally along the front-rear direction of the slide 16. Therefore, the bearing parts 48A and 48B slide horizontally in the openings 42A and 42B along the front-rear direction of the slide 16. Each of the openings 50A and 50B of the bearing parts 48A and 48B has a shape corresponding to the outer shape of each of the crankpins 32A and 32B. That is, each of them has a circular shape. The crankpins 32A and 32B are fitted with the openings 50A and 50B so that the bearing parts 48A and 48B are connected to the crankshaft 32.

The connecting parts 44A1, 44A2, 44B1 and 44B2 are connected to the points 30A, 30B, 30C and 30D so that the yokes 34A and 34B configured as described above are connected to the slide 16. Then, the connection to the slide 16 restricts the moving direction of the yokes 34A and 34B to the moving direction of the slide 16, that is, the vertical direction. As a result, in a case where the crankshaft 32 is rotated, the rotational motion is converted into a reciprocating motion and transmitted to the slide 16.

Thus, the mechanism in which the rotational motion of the crankshaft is converted into the reciprocating motion by the yoke (Scotch yoke mechanism), enables one yoke to be connected to a plurality of points. Therefore, it is possible to arrange a plurality of points in a direction perpendicular to the axial direction of the crankshaft (a direction perpendicular to the longitudinal direction of the slide).

In addition, the mechanism for converting the rotational direction into the reciprocating motion by the yoke can shorten a length of the connecting part between the yoke and the point, as compared with a mechanism using a connecting rod. That is, unlike the mechanism using a connecting rod, because there is no influence of the inclination due to the connecting rod ratio (conrod stroke ratio), it is possible to shorten the length of the connecting part between the yoke and the point. This enables the vertical dimension to be compact. In addition, this can reduce the moment of inertia of the drive system.

As shown in FIGS. 4 and 7, the drive unit 36 has a configuration including two main gears 52A and 52B. In the configuration, the main gear 52A is driven by two motors 54A1 and 54A2, and the main gear 52B is driven by two motors MB1 and 54B2.

The two main gears 52A and 52B have the same configuration and they each are integrally attached to the crankshaft 32. Because one crankshaft 32 is driven with the two main gears 52A and 52B, it is possible to reduce the transmission torque per main gear. This can reduce the tooth widths of the main gears 52A and 52B, and can reduce the moment of inertia of the main gears 52A and 52B. In addition, Because the main gears 52A and 52B are respectively driven by the two motors 54A1 and 54A2, and 54B1 and 54B2, it is possible to reduce the transmission torque per meshing part in the gears. This can further reduce the tooth width of the main gears, and can further reduce the moment of inertia of the main gears.

The respective motors 54A1, 54A2, 54B1 and 54B2 may be made of servomotors each having an identical configuration. The motors 54A1, 54A2, 54B1 and 54B2 are mounted onto motor mounting parts 24A and 24B provided on the crown 24, and they each are arranged at predetermined positions. The respective motors 54A1, 54A2, 54B1 and 54B2 mounted on the motor mounting parts 24A and 24B are arranged so that their output shafts are aligned with the axial direction of the crankshaft 32. As a result, the respective motors 54A1, 54A2, 54B1 and 54B2 are arranged along the longitudinal direction of the slide 16. Thus, even in a case where a motor having a large axial dimension is used, it can be mounted compactly. That is, in a case where the motor is arranged along the direction perpendicular to the longitudinal direction of the slide 16, the motor may protrude in the front-rear direction of the frame 12. On the other hand, according to the embodiment, because the motor is arranged along the longitudinal direction of the slide 16, the motor can be accommodated within the frame 12.

The output shafts of the motors 54A1, 54A2, 54B1 and 54B2 have pinion gears 56A1, 56A2, 56B1 and 56B2, respectively attached thereto. The pinion gears 56A1 and 56A2 are meshed with the main gear 52A. The pinion gears 56B1 and 56B2 in turn are meshed with the main gear 52B. As a result, in a case where the respective motors 54A1, 54A2, 54B1 and 54B2 are driven, the rotations of the respective motors 54A1, 54A2, 54B1 and 54B2 are transmitted to the main gears 52A and 52B via the pinion gears 56A1, 56A2, 56B1 and 56B2 to rotate the main gears 52A and 52B. Then, the rotation of the main gears 52A and 52B rotates the crankshaft 32.

The drive of each of the motors 54A1, 54A2, 54B1 and 54B2 is controlled by a control unit 60. The control unit 60 includes, for example, a microcomputer provided with a processor, a memory, and the like. In this case, the microcomputer functions as the control unit 60 by executing a predetermined control program.

[Press Operation]

In the press machine 10 according to the embodiment configured as described above, in a case where the motors 54A1, 54A2, 54B1 and 54B2 are driven to rotate the crankshaft 32, the rotational motion of the crankshaft 32 is converted into reciprocating motion by the yokes 34A and 34B so that the slide 16 reciprocates in the vertical direction.

FIGS. 8A to 8D are diagrams showing a transition of a state of the slide 16 in a case where the crank is rotated by one rotation. In FIGS. 8A to 8D, the rotation angle θ of the crankshaft 32 is set to 0° in a case where the slide 16 is located at a top dead center.

Figure 8A:
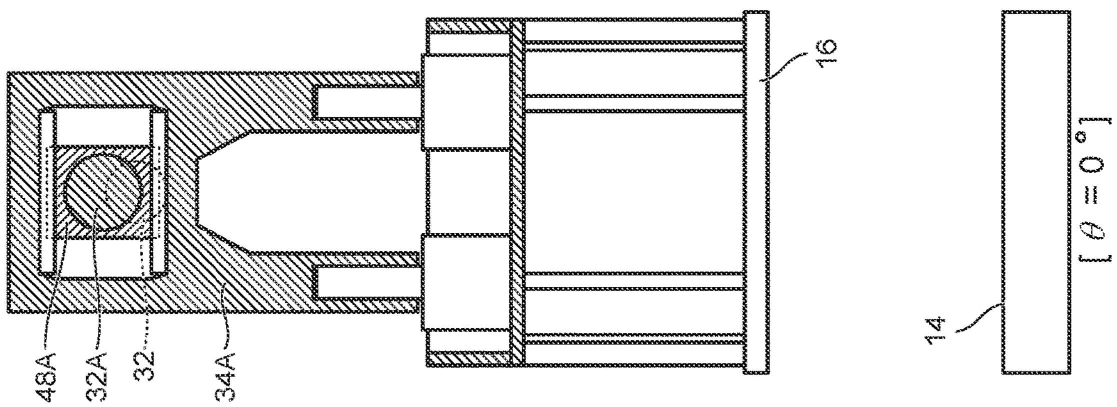
FIGS. 8A to 8D are diagrams showing a transition of a slide state when a crank is rotated by one rotation.
Figure 8B:
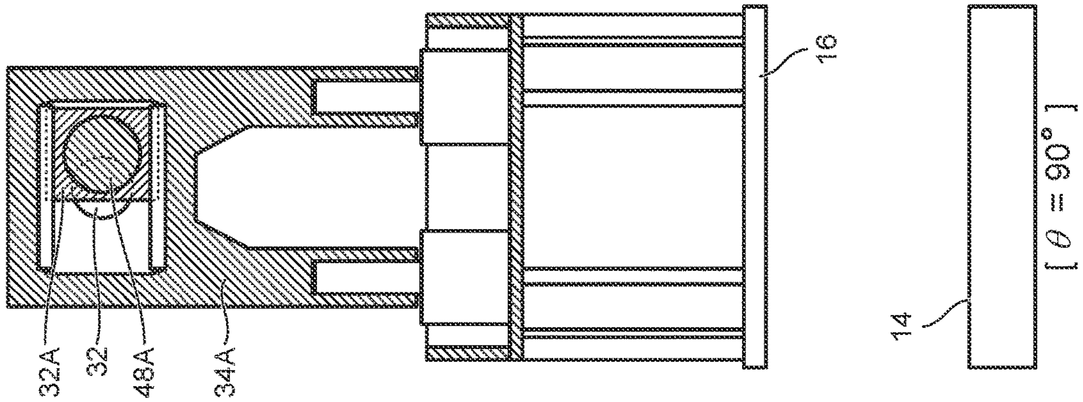
Figure 8C:
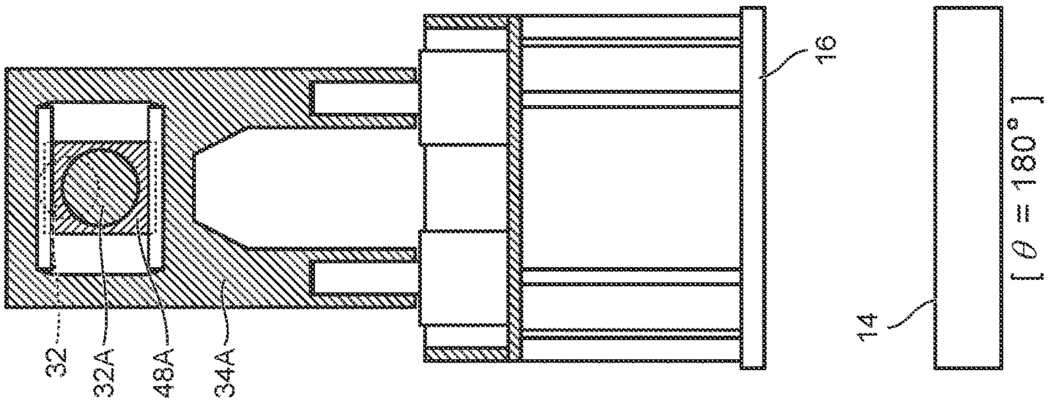
Figure 8D:
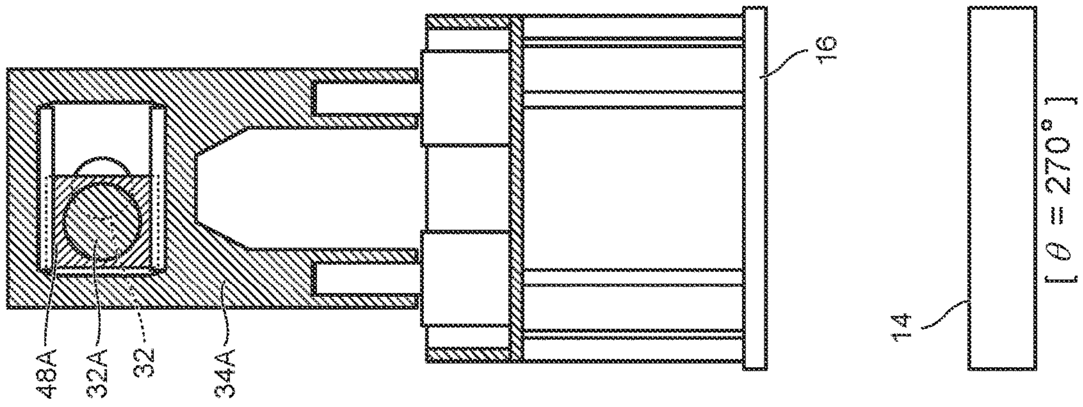

FIG. 8A shows the state of the slide 16 in a case where the rotation angle θ of the crankshaft 32 is 0°. FIG. 8B shows the state of the slide 16 in a case where the rotation angle θ of the crankshaft 32 is 90°. FIG. 8C shows the state of the slide 16 in a case where the rotation angle θ of the crankshaft 32 is 180°. FIG. 8D shows the state of the slide 16 in a case where the rotation angle θ of the crankshaft 32 is 270°.

As shown in FIGS. 8A to 8D, the rotation of the crankshaft 32 causes the crankpins 32A and 32B to rotate eccentrically around the crankshaft 32. Then, the eccentric rotation of the crankpins 32A and 32B causes the bearing parts 48A and 48B which are fitted with the crankpins 32A and 32B, to move along the guide rails 46A and 46B in the openings 42A and 42B of the yoke bodies 40A and 40B. As a result, the yokes 34A and 34B reciprocate in the vertical direction. Then, the reciprocation of the yokes 34A and 34B causes the slides 16 to reciprocate in the vertical direction.

As shown in FIGS. 8A to 8C, the slide 16 descends in a case where the rotation angle θ of the crankshaft 32 is in the range of 0° to 180°. The slide 16 reaches the bottom dead center when the rotation angle θ of the crankshaft 32 is 180°, then, the slide 16 starts ascending. The slide 16 returns to the original position, that is, the top dead center when the rotation angle θ of the crankshaft 32 is 360° (0°).

Continuous rotation of the crankshaft 32 at a constant speed causes the slide 16 to periodically reciprocate in the vertical direction.

As described above, the press machine 10 according to the embodiment can operate the slide 16 with one crankshaft 32. This can simplify the configuration of the drive mechanism of the slide 16 even in a case where the slide 16 is pressed at a plurality of points arranged in the longitudinal direction of the slide 16 and in a direction perpendicular to the longitudinal direction.

In addition, because the Scotch yoke mechanism is used as the drive mechanism of the slide 16, it is possible to shorten the length of the connecting part between the yokes 34A and 34B and the points 30A to 30D. This enables the vertical dimension of the drive mechanism of the slide 16 to be compact. In addition, this can reduce the moment of inertia of the drive system.

Note that, in the embodiment, one crankshaft is driven by two main gears. However, one crankshaft may be configured to be driven by one main gear. Driving one crankshaft with a plurality of main gears can reduce the transmission torque per main gear. This can reduce the tooth width of the main gear, and can reduce the moment of inertia of each main gear.

Note that, in a case where a crankshaft is driven by a plurality of main gears, the crankshaft can be separated into a plurality of shafts, each separately arranged. In this case, as long as the plurality of separated crankshafts are arranged coaxially, they can be regarded as one crankshaft as a whole.

Furthermore, in the embodiment, one main gear is driven by two motors. However, one main gear may be configured to be driven by one motor. As in the press machine 10 according to the embodiment, driving one main gear with a plurality of motors can reduce the transmission torque per meshing part of the gear. This can reduce the tooth width of each main gear, and can reduce the moment of inertia of the main gear.

Second Embodiment

In the above embodiment, the description is made on the configuration in which the slide is pressed at four points. However, according to the present invention, a press machine can be configured such that the slide is pressed at a larger number of points. In the following, a case in which the slide is pressed at five points is to be described.

Figure 9:
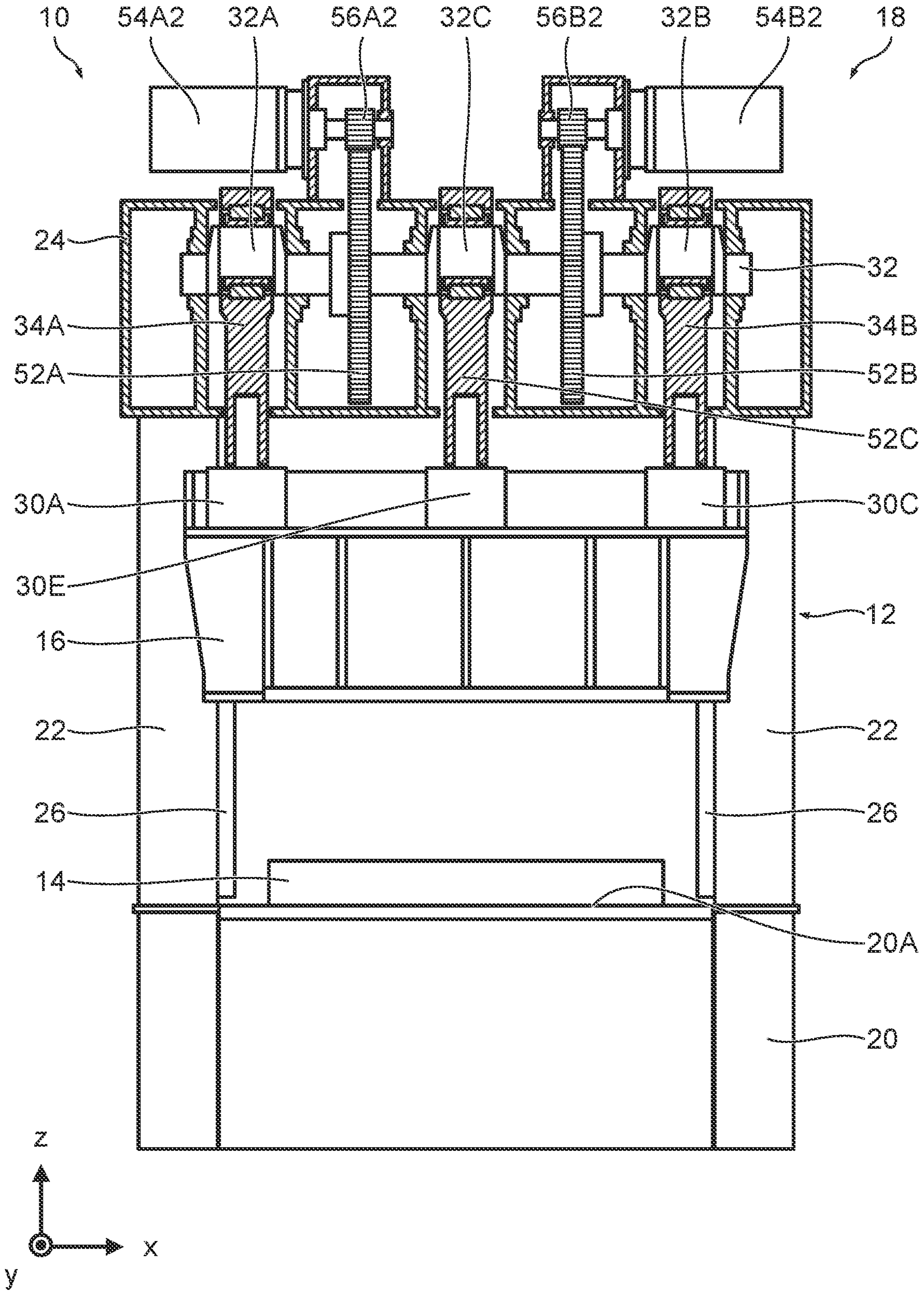
FIG. 9 is a front partial cross-sectional view showing an embodiment of a press machine having a configuration to press a slide at five points.
Figure 10:
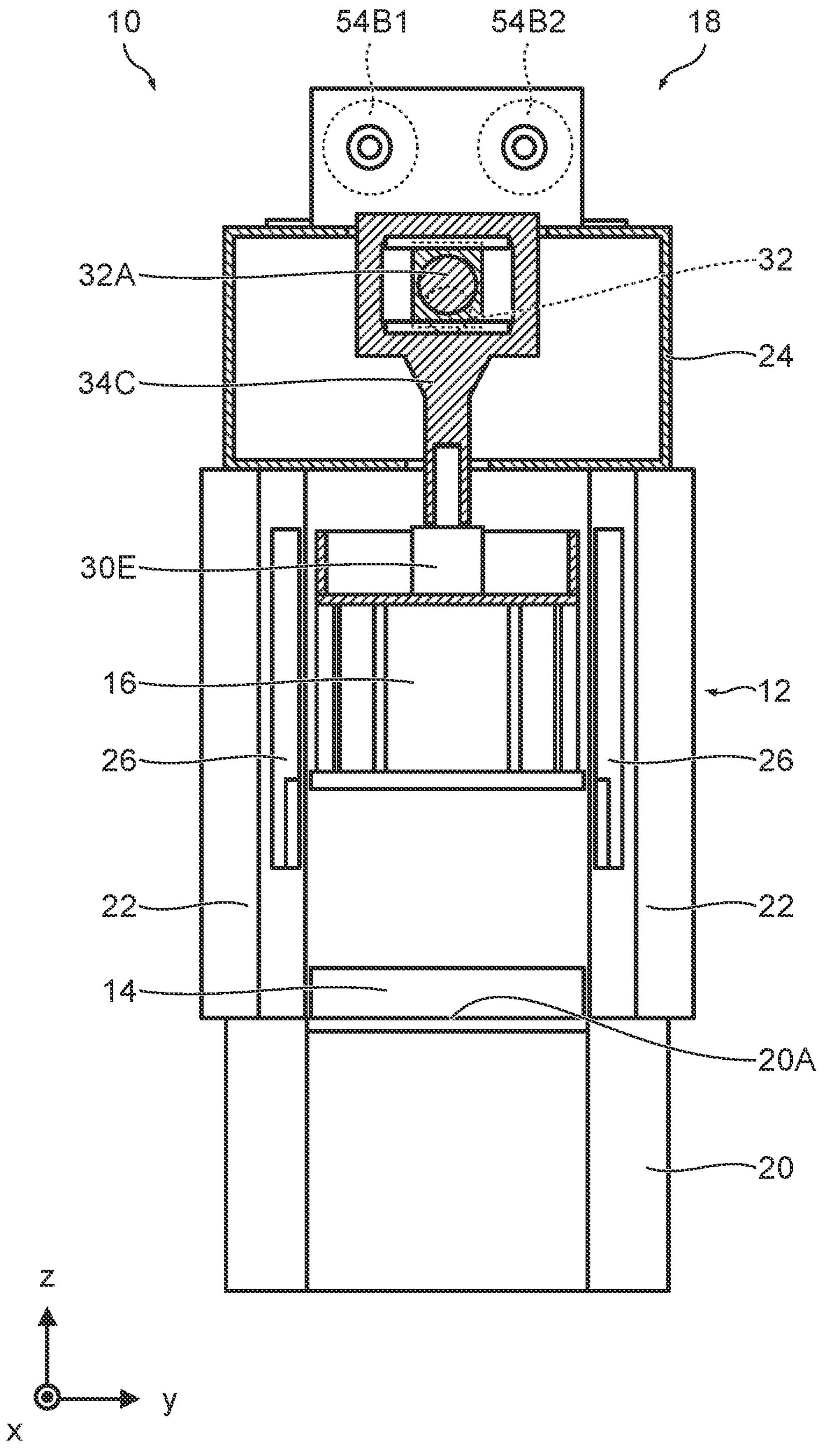
FIG. 10 is a side partial cross-sectional view showing the embodiment of the press machine having the configuration to press the slide at five points.
Figure 11:
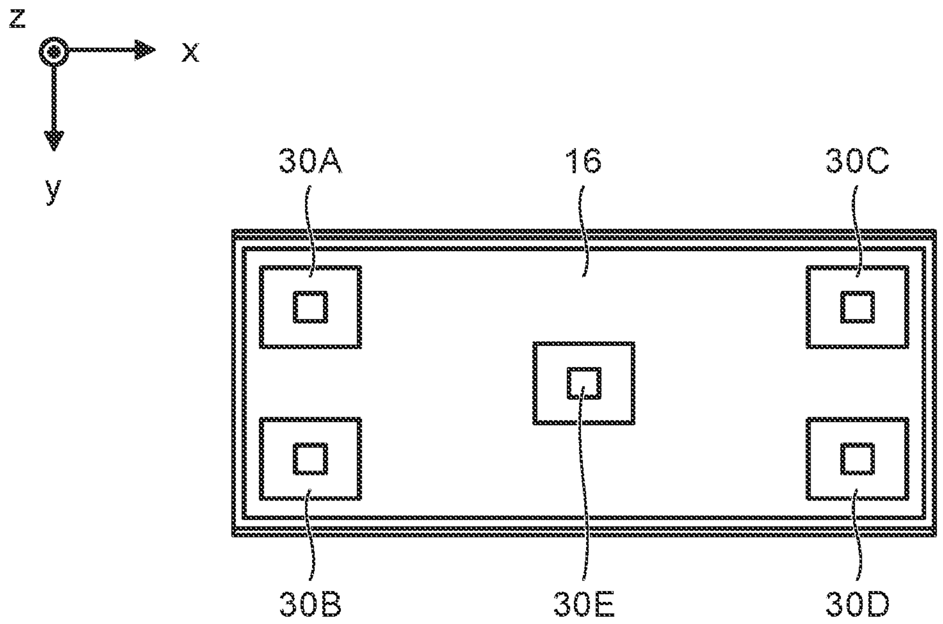
FIG. 11 is a plan view of the slide provided in the press machine shown in FIGS. 9 and 10.

FIGS. 9 and 10 are a front partial cross-sectional view and a side partial cross-sectional view showing an embodiment of a press machine having a configuration in which a slide is pressed at five points. In addition, FIG. 11 is a plan view of the slide provided in the press machine shown in FIGS. 9 and 10.

The press machine 10 according to the embodiment is provided with five points 30A to 30E on the upper surface part of the slide 16. The five points 30A to 30E are arranged at the four corners and the center of the upper surface of the slide 16. The point 30A is designated as a first point 30A, the point 30B as a second point 30B, the point 30C as a third point 30C, the point 30D as a fourth point 30D, and the point 30E as a fifth point 30E so that the respective points 30A to 30E are distinguished.

Because one point is added in the center in addition to the four corners, it is possible to minimize the deflection of the slide 16 at a time of receiving a concentrated load onto the center of the slide 16 even in a case where the rigidity of the slide 16 is reduced. This enables the vertical dimension (height) of the slide 16 to be compact. As a result, the inertia can be reduced. In addition, the height of the entire press machine 10 can be reduced.

Figure 12:
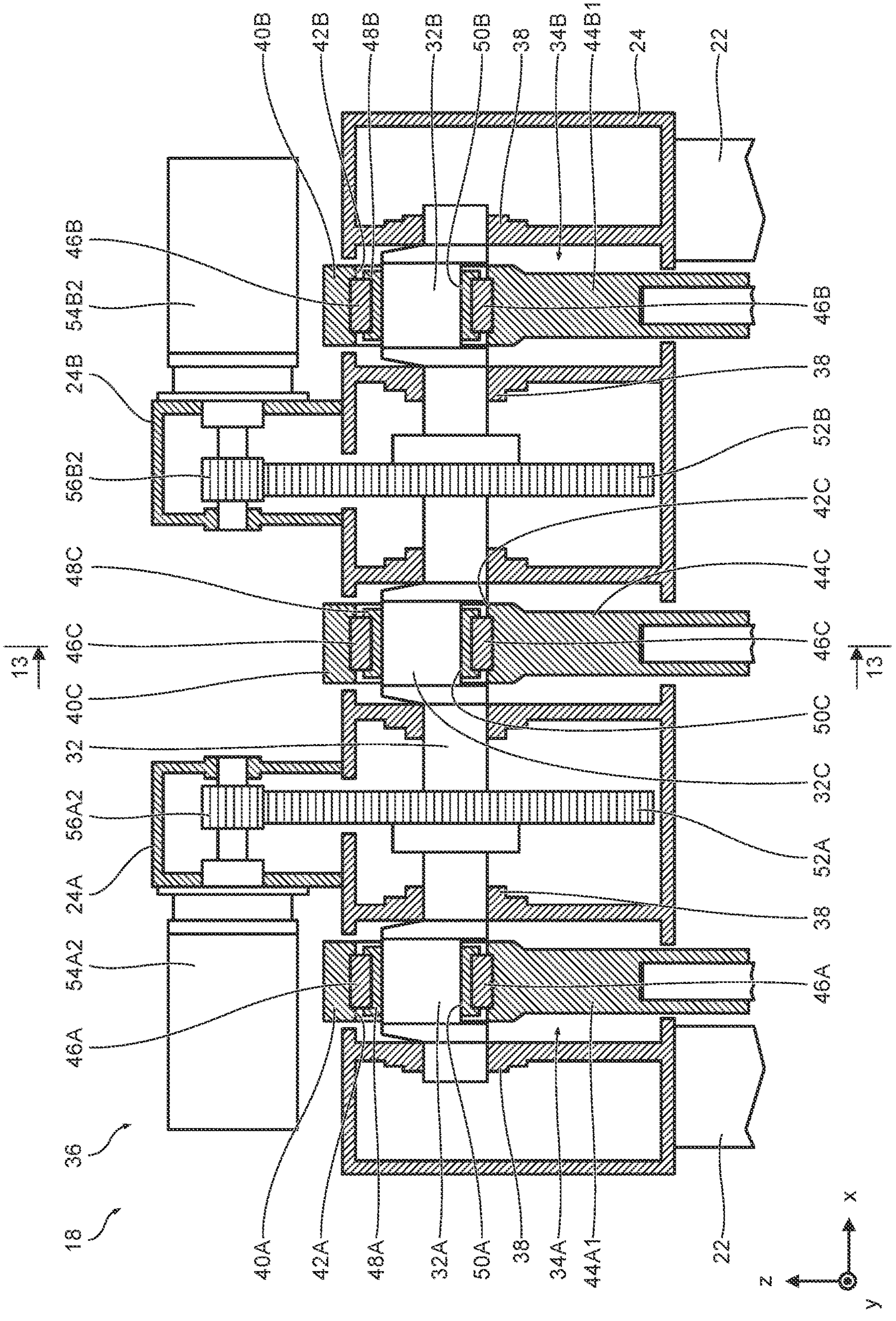
FIG. 12 is a front cross-sectional view showing a schematic configuration of a slide drive mechanism.
Figure 13:
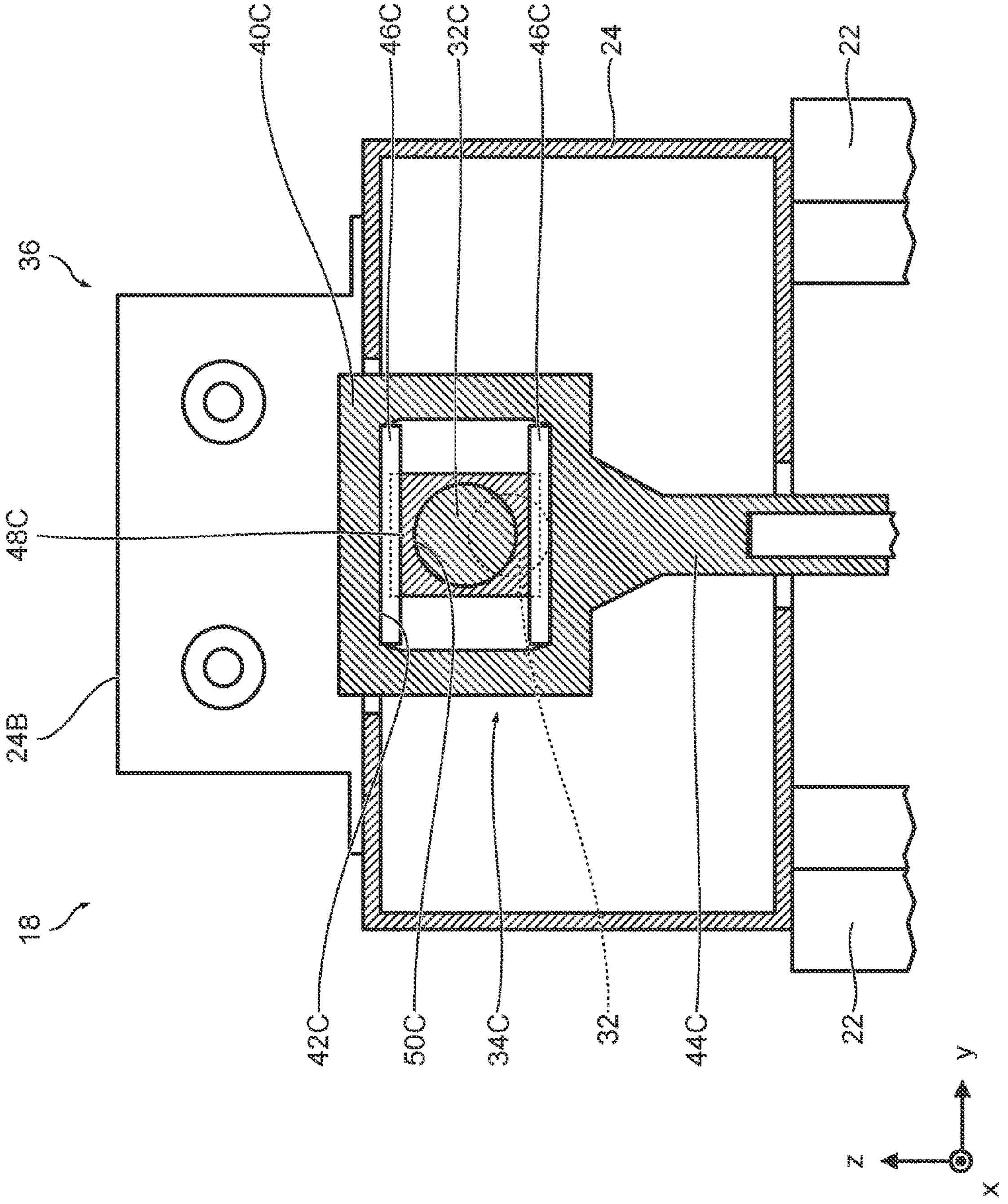
FIG. 13 is a cross-sectional view taken along the line 13-13 of FIG. 12.

FIG. 12 is a front cross-sectional view showing a schematic configuration of the slide drive mechanism. FIG. 13 is a cross-sectional view taken along the line 13-13 of FIG. 12.

In the press machine 10 according to the second embodiment, the slide drive mechanism 18 has the same configuration as the slide drive mechanism 18 of the press machine 10 according to the first embodiment, except that it further has a mechanism for pressing the central point (the fifth point 30E) of the slide 16. Therefore, only the differences from the slide drive mechanism 18 of the press machine 10 according to the first embodiment is to be described here.

As shown in FIG. 12, the slide drive mechanism 18 according to the second embodiment is provided with three yokes 34A to 34C. Hereinafter, the yoke 34A is designated as a first yoke 34A, the yoke 34B as a second yoke 34B, and the yoke 34C as a third yoke 34C so that the respective yokes 34A to 34C are distinguished as necessary.

The configurations of the first yoke 34A and the second yoke 34B are the same as those of the first yoke 34A and the second yoke 34B of the press machine 10 according to the first embodiment. The crankpin 32A is fitted with the opening 50A of the bearing part 48A provided in the opening 42A of the yoke body 40A so that the first yoke 34A is connected to the crankshaft 32. The two connecting parts 44A1 and 44A2 extending from the yoke body 40A are connected to the first point 30A and the second point 30B provided on the slide 16 so that the first yoke 34A is also connected to the slide 16. The crankpin 32B is fitted with the opening 50B of the bearing part 48B provided in the opening 42B of the yoke body 40B so that the second yoke 34B is connected to the crankshaft 32. The the two connecting parts 44B1 and 44B2 extending from the yoke body 40B are connected to the third point 30C and the fourth point 30D provided on the slide 16 so that the second yoke 34B is also connected to the slide 16.

The third yoke 34C is connected to the fifth point 30E provided in the center of the slide 16. The third yoke 34C has: a yoke body 40C; one connecting part 44C extending from the yoke body 40C; guide rails 46C provided in an opening 42C of the yoke body 40C; and a bearing part 48C that slides in the opening 42C of the yoke body 40C along the guide rails 46C.

The crankshaft 32 has a third crankpin 32C in addition to the first crankpin 32A and the second crankpin 32B. The third crankpin 32C is arranged at the center in the axial direction.

The third yoke 34C is provided at the position of the third crankpin 32C. The third crankpin 32C is fitted with an opening 50C of the bearing part 48C provided in the yoke body 40C, so that the third yoke 34C is connected to the crankshaft 32.

The configuration of the drive unit 36 is the same as that of the press machine 10 according to the first embodiment. That is, the drive unit 36 has a configuration such that: the crankshaft 32 has two main gears 52A and 52B; and the main gears 52A and 52B are driven respectively by the two motors 54A1 and 54A2, and MB1 and 54B2.

With the above configuration, in a case where the motors 54A1, 54A2, 54B1 and 54B2 are driven, the crankshaft 32 rotates and the rotational motion of the crankshaft 32 is converted into reciprocating motion by the yokes 34A to 34C, so that the slide 16 reciprocates in the vertical direction.

As described above, the press machine 10 according to the second embodiment can operate the slide 16 with one crankshaft 32 even in a case where the slide 16 is pressed at five points.

Note that, in the second embodiment, the description is made on the case in which the slide 16 is pressed at five points as an example, but according to the present invention, the press machine 10 may be configured such that the slide 16 is pressed at more than five points.

In addition, in the second embodiment, the description is made on the configuration in which the four corners and the center of the slide 16 are pressed in a case where the slide 16 is pressed at five positions, but the positions for pressing the slide 16 are not limited to the configuration. The positions for pressing can be appropriately set depending on the work or the like. In particular, the fifth point other than the four corners can be set to a position shifted from the center. For example, the fifth point can be set at a position shifted by a predetermined amount (distance) from the center of the slide 16 along the axial direction of the crankshaft 32.

Third Embodiment

Here, a description is to be made on an operation method of a press machine 10 in a case where a work is continuously and automatically press-machined. For example, transfer presses need to secure a sufficient work transfer time in one cycle in a case where the works are continuously and automatically machined. Conventionally, the time required to transfer the works has been secured by sufficiently lengthening the press stroke length (stroke length of the slide 16).

However, the longer press stroke length also increases the crankshaft torque, the gear torque around the drive system, and the required torque of the servomotor in the servo press.

As a result, there has been a problem that the press machine becomes larger. In addition, there also has been a problem that the moment of inertia of the drive system increases so that the acceleration/deceleration performance in the press speed is lowered.

Therefore, in the press machine 10 according to the third embodiment, the movement of the slide 16 pauses at the top dead center for a certain period of time every cycle, in the case of continuous automatic press-machining. The pause of the slide 16 at the top dead center for a certain period of time allows to use the pause time in order to transfer the work. This enables the press stroke length to be the minimum necessary.

The minimum necessary press stroke length is 2H+h1+h2 where, H is a height of the work after press-machining, h1 is a gap between a lower end of the work and an upper surface of a lower die, which is required for transferring the work after press-machining, and h2 is a gap between an upper end of the work and a lower surface of an upper die, which is required for transferring the work after press-machining.

Figure 14:
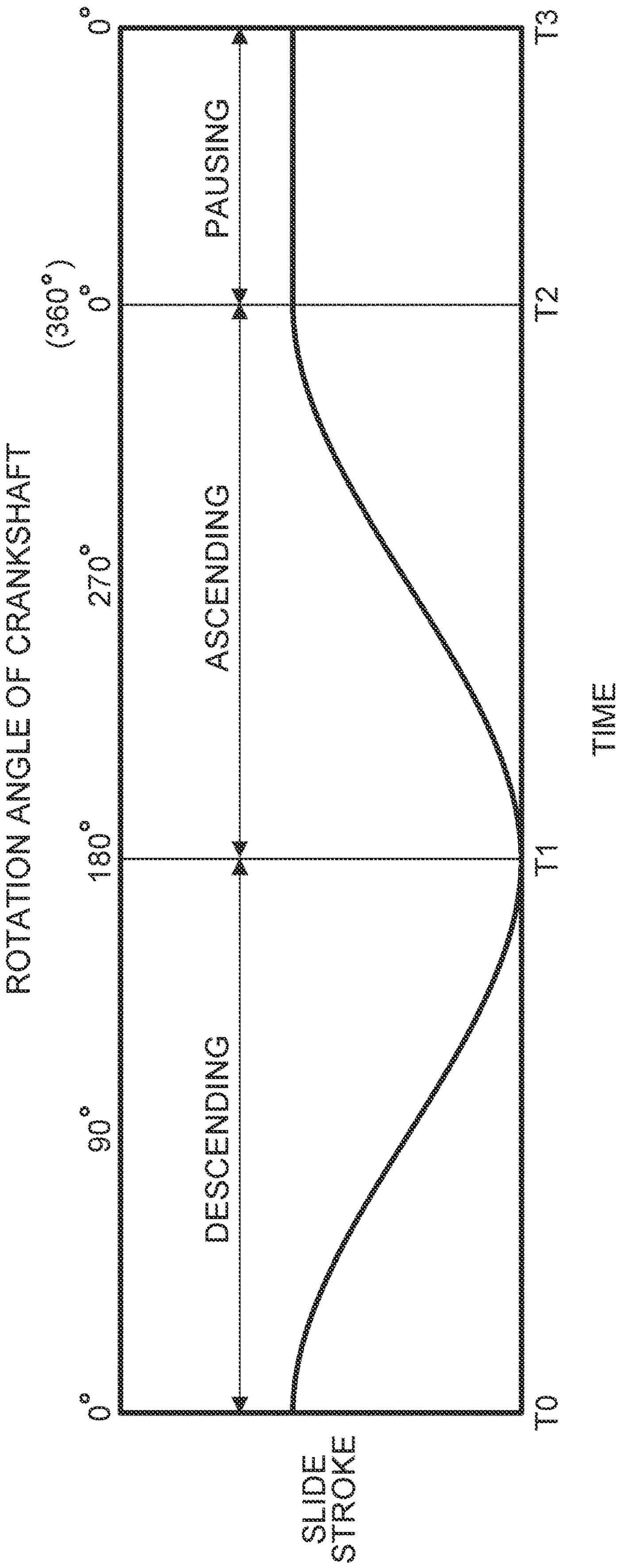
FIG. 14 is a graph showing the operation of the slide in one cycle.

FIG. 14 is a graph showing the operation of the slide in one cycle. In FIG. 14, the horizontal axis represents time and the rotation angle of the crankshaft 32, and the vertical axis represents the slide stroke.

The slide 16 is located at top dead center at time T0. The rotation of the crankshaft 32 causes the slide 16 to descend and to reach the bottom dead center at time T1. At this time, the rotation angle θ of the crankshaft 32 is 180°. Subsequently, the further rotation of the crankshaft 32 causes the slide 16 to ascend and to reach the top dead center at time T2. At this time, the rotation angle θ of the crankshaft 32 is 0° (360°). Subsequently, the rotation of the crankshaft 32 is stopped until time T3 so that the movement of the slide 16 is stopped. That is, the movement of the slide 16 pauses at the top dead center.

The control unit 60 controls the drive of the drive unit 36 so that the slide 16 operates according to the above cycle. That is, the drive of the motors 54A1, 54A2, 54B1 and 54B2 is controlled so that the movement of the slide 16 pauses at the top dead center for a certain period of time. In this case, the above control is achieved by stopping the rotation of the crankshaft 32 at the top dead center of the slide 16 for a certain period of time.

As described above, in the press machine 10 according of the third embodiment, because the press machine 10 is operated so that the movement of the slide 16 pauses at the top dead center for a certain period of time, it is possible to secure a sufficient work transfer time in a case where the work is continuously and automatically press-machined. This enables the press stroke length to be the minimum necessary. Then, the fact that the press stroke length can be the minimum necessary allows compact design of an area around the drive system. In addition, this can reduce the moment of inertia around the drive system.

Note that, in the third embodiment, the movement of the slide 16 pauses at the top dead center for a certain period of time, however, the movement of the slide 16 may pause near the top dead center for a certain period of time. Any configurations can be employed as long as a sufficient work transfer time can be secured. For example, the sufficient work transfer time can also be secured by decelerating the rotation of the crankshaft 32 near the top dead center or near the top dead center.

REFERENCE SIGNS LIST

10 . . . press machine, 12 . . . frame, 14 . . . bolster, 16 . . . slide, 18 . . . slide drive mechanism, 20 . . . bed, 20A . . . upper surface, 22 . . . column, 24 . . . crown, 24A . . . motor mounting part, 24B . . . motor mounting part, 26 . . . slide guide, 30A . . . point (first point), 30B . . . point (second point), 30C . . . point (third point), 30D . . . point (fourth point), 30E . . . point (fifth point), 32 . . . crankshaft, 32A . . . crankpin (first crankpin), 32B . . . crankpin (second crankpin), 32C . . . crankpin (third crankpin), 34A . . . yoke (first yoke), 34B . . . yoke (second yoke), 34C . . . yoke (third yoke), 36 . . . drive unit, 38 . . . shaft support part, 40A . . . yoke body, 40B . . . yoke body, 40C . . . yoke body, 42A . . . opening, 42B . . . opening, 42C . . . opening, 44A1 . . . connecting part, 44A2 . . . connecting part, 44B1 . . . connecting part, 44B2 . . . connecting part, 44C . . . connecting part, 46A . . . guide rails, 46B . . . guide rails, 46C . . . guide rails, 48A . . . bearing part, 48B . . . bearing part, 48C . . . bearing part, 50A . . . opening, 50B . . . opening, 50C . . . opening, 52A . . . main gear, 52B . . . main gear, 54A1 motor, 54A2 . . . motor, 54B1 . . . motor, 54B2 . . . motor, 56A1 . . . pinion gear, 56A2 . . . pinion gear, 56B1 . . . pinion gear, 56B2 . . . pinion gear, 60 . . . control unit

What is claimed is:

1. A press machine, comprising:

a slide supported so as to be reciprocally movable;

a crankshaft arranged along a longitudinal direction of the slide and having a plurality of eccentric parts;

a drive unit configured to rotate the crankshaft;

a plurality of yokes each provided to each of the eccentric parts of the crankshaft and configured to reciprocate along a moving direction of the slide, due to rotation of the crankshaft;

four or more points each connects each of the yokes to the slide; and a plurality of Scotch yoke mechanisms each including the crankshaft and the plurality of yokes, wherein at least one of the plurality of yokes is connected to the slide via some of the four or more points arranged along a direction perpendicular to an axial direction of the crankshaft, and wherein at least two of the plurality of yokes each includes two connecting parts along a direction perpendicular to an axial direction of the crankshaft, and the two connecting parts are respectively connected to two points of the four or more points.

2. The press machine according to claim 1, wherein:

the crankshaft comprises two end parts;

the slide comprises two end parts;

at least two of the plurality of eccentric parts are provided to both of the two end parts of the crankshaft in the axial direction; and at least one of the plurality of yokes which is provided to the eccentric parts at both of the two end parts of the crankshaft in the axial direction is connected to both of the two end parts of the slide in the longitudinal direction via some of the plurality of the points, arranged along the direction perpendicular to the axial direction of the crankshaft.

3. The press machine according to claim 2, wherein:

one of the plurality of eccentric parts is provided between the eccentric parts at the both of the two end parts of the crankshaft in the axial direction; and one of the plurality of yokes which is provided to one of the plurality of eccentric parts provided between the two eccentric parts at the both of the two end parts of the crankshaft in the axial direction is connected to the slide via one of the four or more points.

4. The press machine according to claim 1, wherein the drive unit includes:

two main gears provided on two parts on the crankshaft;

four pinion gears each configured to mesh with the two main gear, two pinion gears of the four pinion gears configured to mesh with each of the two main gears; and four motors configured to rotate the four pinion gears, respectively, wherein the four motors are respectively arranged along the axial direction of the crankshaft.

5. The press machine according to claim 1, wherein:

a press stroke length is 2H+h1+h2 where, H is a height of the work after press-machining, h1 is a gap between a lower end of the work and an upper surface of a lower die, which is required for transferring the work after press-machining, and h2 is a gap between an upper end of the work and a lower surface of an upper die, which is required for transferring the work after press-machining, the press machine further comprises a control unit configured to control drive of the drive unit, the control unit controls drive of the drive unit so that movement of the slide pauses at a top dead center or near the top dead center for a certain period of time every cycle, and the certain period of time is a time required for transferring the work after press-machining.

6. The press machine according to claim 5, wherein the control unit drives the crankshaft to stop rotation or decelerate rotation at the top dead center or near the top dead center of the slide.

* * * * *